Figure 1:
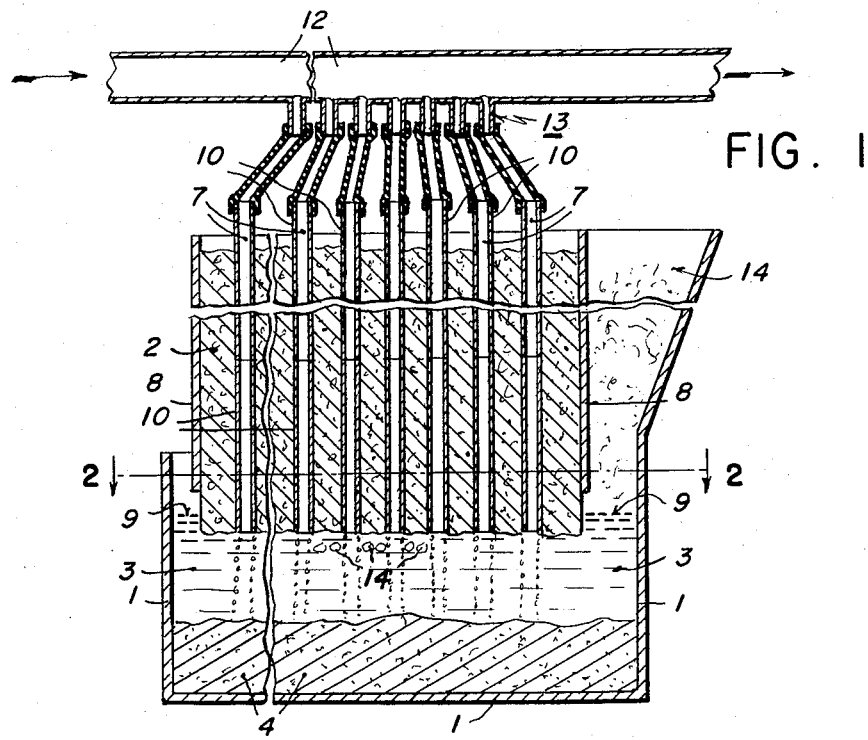

Dec. 15, 1959 H. J. DONALD 2,917,441
SELF BAKING ELECTRODE CONSTRUCTION
Filed Dec. 28, 1955

INVENTOR
H. JACK DONALD

BY *A. A. Saffetz*

ATTORNEY

United States Patent Office 2,917,441
Patented Dec. 15, 1959

2,917,441

SELF BAKING ELECTRODE CONSTRUCTION

Harold Jack Donald, Penn Township, Allegheny County, Pa., assignor, by mesne assignments, to Reading Anthracite Company, Pottsville, Pa., a corporation of Pennsylvania Application December 28, 1955, Serial No. 555,922

2 Claims. (Cl. 204—67)

This invention relates to the improvement in operation of self-baking electrodes as these are utilized in the electrolytic production of metals, such as aluminum, in an electrolytic furnace or cell and includes methods, electrode modifications and apparatus, for the removal of gases generated in said cell which tend to collect at the base of said electrode and adversely affect the efficient electrolytic operation desired.

In the commercial production of aluminum by electrolysis of a fused salt bath containing the source material, anhydrous aluminum oxide which is usually chemically extracted from bauxite, in a fused electrolyte, cryolite, self-baking continuous electrodes have afforded certain advantages. The continuous self-baking electrode which is generally used as the carbon anode in the commercial process is well known and commonly referred to as the Soderberg electrode, having been described in such early patents granted to Soderberg as U.S. Patent No. 1,442,031 and U.S. Patent No. 1,670,052.

These Soderberg electrodes usually comprise a plastic or fluid composition having the consistency of a paste and containing a mixture of tar or pitch as the binder and conducting carbon granules or carbon powder, which form the baked conducting material. The paste is continuously passed through a molding casing which it fills and is appropriately positioned relative to the electrolyte for use as an electrode. The paste portion subjected to the heat of the molten electrolyte is baked while the electrolytic operation is carried out in the hot fused electrolyte bath. The self-baking anode, which is immersed to the required depth and adjusted to maintain a correct distance between the under side of the anode provides for the efficient production of a layer of molten aluminum at the base of the bath and underneath the electrolyte.

The bath temperature is maintained at 900° to 1000° C., the heat necessary being supplied by the electrical resistance of the electrodes and electrolyte. In large scale operations, batteries of the continuous self-baking anodes are used.

The ensuing reaction is a combination of the oxygen from the alumina with the carbon of the anodes which are consumed during electrolysis. As a result, carbon monoxide and carbon dioxide are formed at the anode in large quantities and these gases are allowed to escape.

As a general rule, it is recognized that about 1 pound of carbon is burned for each kilogram of aluminum produced. In the unbaked form of the anode comprising the paste of pitch and carbon, the anode is essentially non-productive of electrolytically formed aluminum. The high temperature of the fused electrolyte bath effectively bakes the paste to convert the carbon particles therein to electrically conducting hard carbon and substantial amounts of hydrocarbon gases as well as the mentioned carbon monoxide and carbon dioxide gases are evolved from the cell.

These gases evolved in the cell create a problem for their segregation and collection, not only because they possess obnoxious and toxic characteristics to impair the efficiency of the electrolytic operation, but also because they increase the power consumption at the anode and cause an increase in the carbon consumption at the anode due to the chemical reactivity of the gases, carbon dioxide for example, with the carbon of the anode at the elevated temperatures of operation.

Obstruction to the unimpeded escape of these evolved gases further results in view of the tendency for crust formation at the surface of the hot electrolyte bath during electrolysis. The crust is formed as a result of a drop in temperature at the bath surface as compared with the temperature in the interior of the bath. An important factor affecting this temperature drop at the surface and the resulting crust formation is the increase in the so-called "anodic effect" usually coincident with the drop in alumina content in the bath and accompanied by an increase in cell voltage. The increase in power consumption due to the evolved gases collecting at the anode, aggravated by the "anodic effect" and the increased carbon consumption of the anode caused by such gas collection thus impairs the electrical efficiency and impairs the feeding of raw materials to the cell which is an essential factor in continuous operation during which the raw alumina is fed, cryolite is replenished, as required, and molten aluminum is withdrawn.

Prior efforts have been made to circumvent the uncontrolled development of the "anodic effect," crust formation and the undesirable gas collection about the self-baking anode with its adverse effect on power consumption, carbon consumption and bath temperature control. Suggestions have been made to encase the outside of the anode in a chamber, which may be compartmented to remove gases evolving from the surface of the bath about the anode. Such chambers have been used for hydrocarbon gas removal near the bath surface or contiguous to the bath surface and the hydrocarbon gases have been recovered for use as combustible gases. However, these prior procedures, although they have limited to some extent the degree of crust formation and decreased the extent of the anodic effect, have not proved satisfactory in preventing the collection of gases at the base of the anode. Even by recirculation of hydrocarbon gases recovered through such chambers, and by burning these gases over surface areas somewhat remote from the anode to dissipate crust formation, the attained result does not come to grips with the problem of removing gases below the bath surface located under the anode base. Also, extending the distance of the spacing of the chamber walls from the anode provides no means for dealing with these gases in the bath below the base of the anode.

An object of the invention is to remove the gases collecting at or in the electrolyte bath, particularly at the base of the self-baking continuous anode of the Soderberg type, employed in the electrolytic production of aluminum, to decrease the volume of gas retained in the cell, to decrease the resistance to electrical current flow, to decrease carbon consumption at the anode due to chemical reaction of these gases with the carbon of the anode, to improve the electrical efficiency of the operation and to overcome the disadvantageous effects outlined above in the continuous process of producing aluminum electrolytically.

The foregoing and other objects are accomplished by providing open-ended channels in the body of said self-baking anode while it is in the paste condition, said channels extending throughout the height of the anodes and lined with hollow aluminum tubing of appropriate cross-sectional shape, to lead the gases through the anode and out of the bath, preferably through a collecting distributor and exhaust system. The exhaust system may, if desired, be of the induced draft type, in which the gases evolved by the cell are returned by the draft induced in the tubing, and wherein a forced draft spaced overhead in an exhaust conduit serves to lead the gases passing upwardly through the tubing and away from the cell.

As a result of the provision of aluminum walls in said channels, the heat of baking at the base of the anode is also sufficient to melt the aluminum, without causing obturation of the channel openings. The melting of the aluminum tubing adds no impurities to the bath and at the same time improve the anode baking operation because of the greater surface presented by the channels and improved heat conduction through said aluminum walls. The channels facilitate the rapid removal of the gases produced by the cell reactions and which normally collect at or in the bath.

Other and further objects of the present invention will appear from the more detailed description set forth below, it being understood that such more detailed description is given by way of illustration and explanation only and not by way of limitation, since various changes therein may be made by those skilled in the art without departing from the scope and spirit of the present invention. Other advantages and features of the invention will become apparent from the following description, read in connection with the accompanying drawings, in which there is shown, In Fig. 1, a fragmentary view in vertical section, diagrammatically showing the relationship of the novel self-baking anode construction to the molten electrolyte bath, and embracing means for withdrawal and segregation of gases generated by the electrolytic operation; and in Fig. 2, a horizontal section taken along line 2—2 of Fig. 1.

Figure 2:
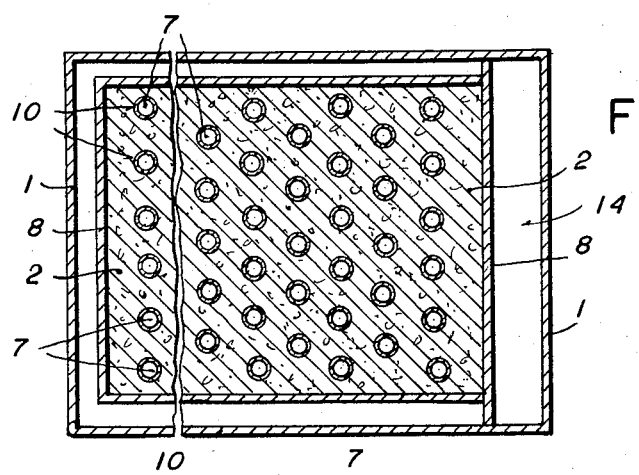

During normal electrolytic operation of an alumina-cryolite bath in the molten condition and as illustrated in Figs. 1 and 2, the cell 1 containing the mixture of alumina and cryolite is positioned relative to the continuous, self-baking, carbonaceous electrode of the Soderberg type 2 so that the bottom of the electrode 2 is immersed at a predetermined distance below the exposed surface 9 of the bath. The layer 4 of aluminum at the bottom of the cell 1 constitutes the cathode while the self-baking electrode 2 constitutes the anode. Raw material may be fed into the bath to maintain the desired mixture of the components in the liquid composition in the cell.

It is desirable that objectionable crust formation be kept to a minimum by spacing the anode mold casing 8 about two inches from the interior wall of the cell 1 and by providing open ended channels for the elimination of substantially all of the gas formed through the anode body itself. The lateral extent of the molten area about the perimeter of the immersion zone of the self-baking electrode 2 is of the order of about 2 inches at the usual bath temperature. Beyond this area the tendency for crust formation increases with increasing distance.

An advantage of the invention is the reduction in power consumption and the reduction in carbon consumption at the anode which results from the provision of the vertical channels 7 for the escape of gases collecting at the base of the anode 2 and the provision of gas removal means illustratively shown in Fig. 1.

The gas removal means comprises the spider 13 connecting each of the hollow aluminum tubes 10 in the anode to exhaust duct 12 fitted with appropriate blower and/or exhausting means, not shown.

In order to further illustrate the improvement in operation and the novel structural and apparatus features, reference is made to the following example, given by way of illustration and not limitation.

*Example 1*

In a cell, as shown in Fig. 1, alumina and cryolite are charged in the known proportions for electrolysis using the Soderberg continuous self-baking electrode 2. The paste composition of the anode is approximately 25% of coal tar and approximately 75% of finely divided conductive carbon powder, these in intimate admixture. The hydrocarbon binder, such as coal tar or pitch, may vary from 20–30% and the carbon from 70–80%.

Without the provision of open-ended vertical channels 7 formed by inserting hollow aluminum tubes 10 throughout the paste body of anode 2, the normal operation of the process results in the baking of the immersed portion of the electrode 2 and the heating of the portions of the paste above the bath to liberate volatile hydrocarbon constituents from the hydrocarbon binder, usually about 50% of the binder being converted into gaseous products.

The temperature of the molten electrolyte is maintained at about 955° C. The bath tends to solidify at about 900° C. Continuous or intermittent additions of alumina and/or cryolite as may be necessary, reduce the bath temperature to about 925° C. The current in the cell is adjusted to maintain these optimum temperature values and prevent solidification of the bath. About 0.55 kilogram of anode is consumed per kilogram of aluminum produced.

The cell gases 14 in Fig. 1, formed at the base of the anode near the center comprise essentially carbon monoxide, about 55%, carbon dioxide, about 45%, and small proportions of fluorine which may vary in accordance with variations encountered during operation.

In the absence of the channels 7, the production of carbon dioxide and carbon monoxide at a rate of 0.55 kg. of carbon per kg. of aluminum produced, or about 1.75 kg. of gases per each kg. of aluminum, results in further chemical decomposition of the carbon in accordance with the equation $$CO_2 + C = 2CO$$

The power consumption increases. The costs of producing aluminum thus increase as a result of these two factors, namely increased power over the energy requirement of 18 kilowatt hours per kilogram of aluminum and increased carbon consumption. A considerable factor of the increased cost in the production of aluminum is due to this latter factor of carbon consumption.

The hollow aluminum tubes are distributed throughout the cross-sectional area of the self-baking electrode to satisfy the requirements of—

(a) The effective gas removal on the basis of 1.75 kg. of gases per each kg. of aluminum produced, and (b) To provide an effective electrical conducting carbon mass of the anode immersed below the surface of the bath.

The diameter of the hollow aluminum tubes and the thickness of the walls of these tubes thus depends upon the size of the cell which in turn determines the production of aluminum.

In the foregoing example the diameter of the tubes is ½ inch and the tube thickness ⅟₁₆ of an inch but it should be recognized that the diameter may vary from ¼ inch to 3 or 4 inches or more and the tube thickness may likewise vary from 0.01 inch to 0.25 inch. It is preferred that the thickness of the tube be small in order to reduce the cost factor. However, the tube must be thick enough in order to effectively penetrate through the paste of the anode.

Conveniently, as shown in Fig. 1, a battery of tubes may be mounted in a holder and mechanically or hydraulically pressed through the continuous paste electrode. Tube sections rather than tubes in the finished length may be inserted in this manner to provide open-ended vertical channels between the spider 13 and the tubes 10.

Because the melting point of the aluminum channels is above the solidification temperature of the binder used in the electrodes, aluminum is even more valuable as a channel liner. If the melting point of the channels were lower than the solidification point of the binder the channels would collapse before the paste mix had formed the channel.

The melting of the aluminum tube occurs somewhat above the bath surface as the melting point of aluminum is considerably lower than the bath temperature. The gases are then able to penetrate the anode and be released within the channels affording another path for the gases (carbon oxides).

In the embodiment shown in Fig. 2 a total of 39 tubes are shown, these comprising alternating rows of 6 tubes each and alternating rows of 5 tubes each, the 5 tube rows being positioned between the 6 tube rows. The spacing of the tubes from each other at distances of about twice the diameter of the tubes as shown in Fig. 2 is such as to provide maximum surface of carbon immersed below the bath surface 9.

As shown in Fig. 1, the aluminum melts and forms globules of aluminum 18 which settle to the aluminum cathode layer 4. The flow of the carbonaceous gases upwards through the channels is shown by arrows 16 and it is seen that the gases evolved are eliminated substantially as they are formed at the base of the anode.

Due to the elimination of these gases substantially as they are formed, bubble formation at the base of the electrode is effectively prevented. This results in eliminating the increased electrical resistance provided by the gas bubbles at the base and accordingly provides for a reduction in the power requirement. At the same time, the evolution of gases due to the liberation of hydrocarbon volatiles from the paste is effectively permitted in the zones where the tubes meet the bath surfaces, these zones located slightly above and below the base surface 9 and the hydrocarbon gases also escape at the sides of the anode mold casing 8.

As previously mentioned, the hydrocarbon gases constitute about 50% of the hydrocarbon binder. Thus in Example 1, each 100 kg. of paste provides about 12.5 kg. of volatile hydrocarbons which may be segregated from the carbon oxide gases by providing a gas dome (not shown) over the cell. A portion of these volatile hydrocarbons may enter the tubes 10. The majority of the gas is formed by burning the carbon anode. About 1.75 kg. of carbon oxide gases are produced per each kg. of aluminum which is made, and this corresponds to 0.55 kg. of carbon anode which is consumed are the gases led in the direction of the arrows 16 through tubes 10 into the exhaust duct 12. The exhaust duct 12 with its fitted spider 13 is movable and is conveniently a subinstallation for use in a battery of cells each with its separate duct and spider. The spider 13 is connected to the tubes by means of flexible connecting tubes, preferably of inert, heat-resistant synthetic rubber, molded silicone, tetrafluoroethylene or other equivalent material.

The recovered gases are useful for heating purposes but usually require removal of the small amounts of fluorine which contaminate the gases. Fluorine may be removed by chemical absorbers in order to reduce the corrosive nature of the recovered gases.

The electrode used in Example 1 was made by pushing the aluminum tubes through the soft paste of the electrode. Other methods may be used in preparing the paste electrode with tubing. For example, the tubes 10 may be placed in the mold casing in finished lengths or in abutting sections and the paste filled in around the tubes.

The tubes have been illustrated in Fig. 1 as being circular in cross section. The shape is not critical. Other shapes may be used, for example rectangular shapes, oval shapes, triangular shapes, etc. The circular cross section is preferred however, since it provides optimum channel dimensions for the rapid elimination of the bubbles of gases as soon as they are formed below the surface of the bath.

Likewise, the cell shape and dimensions illustrated as rectangular may be varied, if desired. Conveniently, however, the rectangular shape is that which is used.

As a result of the melting of the aluminum material forming the tubes 10, the amount of aluminum produced is increased by the small amount added from the tubes. No impurity is introduced into the aluminum in this matter. In instances where alloys of aluminum, such as those containing magnesium, for example, are to be prepared from the aluminum recovered in the process, it is feasible to employ a tube formed from the same material as the alloy which is to be produced, providing that the said alloy is molten under the conditions of cell temperature employed for electrolysis.

The amount of alloying element, such as magnesium, introduced by the tubes is very small. However the difference in its melting point as compared with the melting point of a pure aluminum tube may serve to permit carrying out cell operations at higher bath temperatures which is frequently of value.

The carbonization of the carbonaceous mass of the electrode at the walls of the aluminum tube 10 occurs more rapidly in anode structures of the present invention because of increased heat conductivity of the aluminum tube. Effectively, the perforation of the anode provides a great increase of the surface area of the paste which is undergoing carbonization in its immersed state below the surface of the bath. This speeds up the baking process. Control of the temperature in the bath is made much easier because of the more rapid attainment of optimum conductivity of the immersed anode portions.

Liberation of the evolved gases as they are formed removes an insulating material from the bath before it adversely affects the power consumption required for electrolysis. Immediate removal of small gas bubbles avoids the formation of large bubbles having a higher insulation value. Greater uniformity in the manufacture of the optimum temperature gradient is obtained at the electrolyte stratum 5 shown in Fig. 1. This stratum, between the anode base and above the aluminum cathode layer, maintained at the proper temperature gradient decreases the tendency for the formation of crust 6 at the bath surface. Significantly, due to the high heat conductivity of aluminum or its alloys, no crust is formed within the tubes 10.

While I have described my invention in accordance with desirable embodiments, it is obvious that many changes may be made in the details of construction and procedure, in the combination of parts and materials as well as in the steps of the process, without departing from the spirit of the invention as defined in the following claims.

Having thus set forth my invention, I claim:

1. In a method of performing electrolytic reduction of alumina in a fused cryolite bath fed with alumina outside of the electrode by passing electrical current through a Soderberg continuous self-baking carbonaceous paste anode which is immersed in said fused bath, said anode consisting of a hydrocarbon binder and conducting carbon, that improvement in removing gases resulting from the baking of said paste anode and oxidation of said anode in said bath comprising inserting open-ended hollow aluminum tubes into and through the mass of said paste anode along the length thereof, said open ended tubes being spaced uniformly apart over the cross sectional area of said anode, fitting the end of each of said tubes with flexible connectors, fitting said flexible connectors to exhaust means and immersing said electrode below the surface of the molten electrolytic bath whereby gases formed at the base of said electrode pass through said hollow aluminum tubes in said anode during baking and oxidation of said anode as soon as said gases are formed at said anode in said bath.

2. In combination, a Soderberg continuous self baking paste electrode consisting of a hydrocarbon binder and conducting carbon, a plurality of open-ended hollow aluminum tubes extending into and through the entire length of said electrode, said plurality of open ended aluminum tubes being spaced apart each at a uniform distance across the cross sectional area of said electrode, exhaust means in communication with the open end of each of said tubes opposite the end of said electrode which is immersed in the fused electrolyte bath, the open end of each of said tubes being fitted with flexible connectors at said opposite end which are in communication with said exhaust means and induced draft means for said exhaust means which exhausts the gases passing through said vertical aluminum tubes, flexible connector and exhaust means upon baking and using the electrode in a fused cryolite alumina bath.

References Cited in the file of this patent

UNITED STATES PATENTS

| | | |
|---|---|---|
| 2,593,741 | Ferrand | Apr. 22, 1952 |

FOREIGN PATENTS

| | | |
|---|---|---|
| 180,517 | Switzerland | Jan. 16, 1936 |
| 1,035,887 | France | Apr. 22, 1953 |
| 1,042,637 | France | June 10, 1953 |